Nov. 23, 1954
J. F. RUCK
2,695,047
SELF-BALANCING AUTO TUBE AND TIRE
Filed March 6, 1951
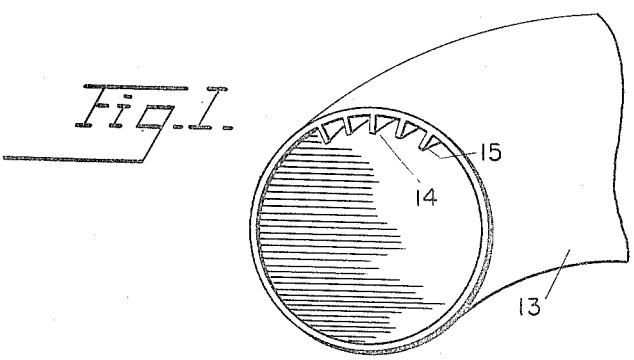
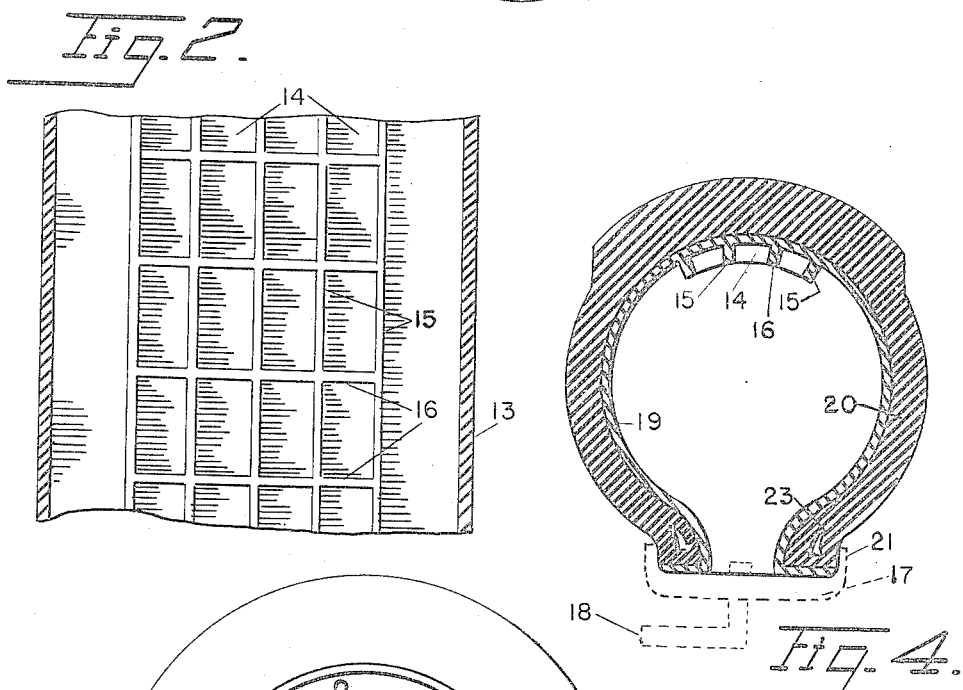
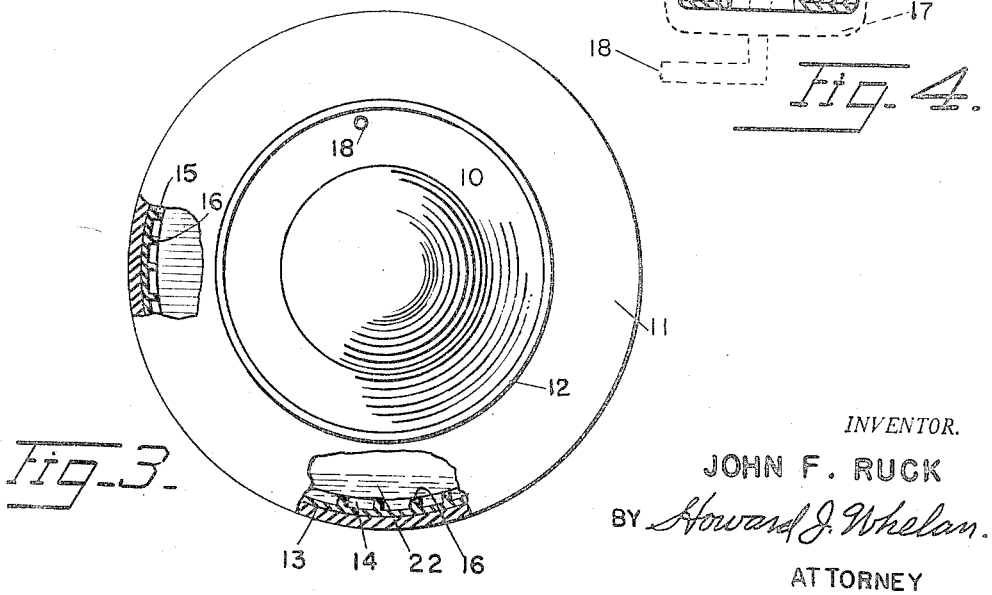
INVENTOR.
JOHN F. RUCK
BY Howard J. Whelan.
ATTORNEY

United States Patent Office 2,695,047
Patented Nov. 23, 1954

2,695,047

SELF-BALANCING AUTO TUBE AND TIRE

John F. Ruck, Baltimore, Md.

Application March 6, 1951, Serial No. 214,134

1 Claim. (Cl. 152—330)

This invention relates to pneumatic tires or those having an internal chamber or passage in their structure, and particularly to those intended to be self-balancing.

The use of pneumatic tires on motor vehicles and the high speed that present circumstances involve in their use, make the balancing of the wheels on which the tires are mounted a matter of considerable importance. It is customary to provide for same by welding or otherwise attaching weights to the rims of the wheels until the weight and balance resulting is uniformly distributed. When this balance is established the wheel is so arranged that it is able to run evenly. If unbalanced, the usual effect is to make the wheel run unevenly and with a tendency to vibrate and shimmy peripherally and sidewise. In this invention the balancing of the wheel is provided for by the employment of a special tire tubing or casing in which a series of cells are integrated capable of receiving a suitable amount of free fluid therein. This fluid is so disposed that it is capable of being distributed from one location to another over the cell surface of the tire to adjust the weight thereof so it will become balanced while running or turning.

The object of this invention is to provide a new and improved tire tubing or casing for a wheeled vehicle that will avoid one or more of the disadvantages and limitations of the prior art.

Another object of the invention is to provide a new and improved tire tubing or casing for a vehicle wheel that will be self-balancing.

A further object of this invention is to provide a new and improved pneumatic tire tubing or casing that will include an internal medium loosely placed therein adapted to progress from one position to another and adapt itself to overcome any unevenness of balance that may exist therein.

An additional object of the invention is to provide a new and improved tire tubing and casing for a vehicle wheel that will balance itself and eliminate shimmying by the distribution of a movable fluid therein as the wheel is rolled over a surface.

Other objects of the invention will become apparent as the invention is more fully set forth.

For a better understanding of the invention and the objects thereof, reference is made to the accompanying drawings and the following description thereof, while the claim indicates the scope of the invention.

Referring to the drawings:

Figure 1 is a perspective view of the tube used in this form of the invention;

Figure 2 is a plan view of an interior section of the tube indicating the cellular construction used thereon;

Figure 3 is a side elevation of an automobile wheel partly broken away with a pneumatic tire including a tire tube therein embodying this invention; and Figure 4 is a modified form of the invention showing the use of the balancing cellular structure embodied in a tubeless pneumatic tire.

Similar parts throughout the drawings are designated by the same reference numerals.

In the forms shown in the drawings, and particularly in Figure 3, a wheel 10 of conventional automobile construction has a tire casing 11 mounted peripherally on its rim 12. The inner tubing 13 is blown up inside the casing 11 and fills the latter pneumatically. The balancing arrangement consists of an integral cellular structure or cells 14 imbedded in the peripheral internal surface portion of the tubing and for usual purposes extends about three inches transversely across the central plane of the tube. The cellular structure comprises a series of longitudinal partitions 15 about ¾" high for normal requirements. These partitions 15 are intercepted by other transverse partitions 16 which serve to enclose rectangular cells 14 in which liquid can be collected. Water or some low freezing liquid such as glycerine or alcohol are preferably used and poured into the casing in sufficient quantity to provide for balancing. The quantity is normally about one half gallon but can be varied to suit circumstances, such as size of tire, unbalance and speed of wheel during use. The liquid 22 is poured in through the valve body 18 of the tire by temporarily removing its valve stem.

In the modified form shown in Figure 4, the cellular structure 14 is similar to that already described and attached to the inner resilient lining 19 of a tubeless casing 20 in the same position. The tubeless casing 20 is made with an enlarged rim shoulder 23 adapted to fit into the inwardly curved edge portions 21 of a special rim 17 provided on the wheel 10, that carries the tire.

When the tires are in place on a rotating wheel, the liquid 22 is levelled off about 1" above the tops of the lowest partitions and is forced by centrifugal force to press against the inner peripheral surface of the tubing 13 and inside the cells 14. The partitions 15 and 16 limit the movement of the balancing liquid and restrain its movement during the rotation of the tire and serves to prevent any tendency of the wheel to shimmy or otherwise be out of balance. Any unusual shaking of the wheel and tire induces the liquid to move against the partitions and establish an equilibrium. In practice, the use of the liquid as set forth indicates a complete elimination of all noticeable shimmying in both the vertical and horizontal planes of the wheel and tire. Thus a wobble in the wheel is overcome, by such method, and is avoided by the manner in which this invention is employed. The method of automatically balancing a wheel as set out in this invention creates a permanent balance of the wheel, whereas the conventional method requires balancing periodically due to wear conditions of the tire and repairs made thereto. The reference made to the tire, is intended to include tire tubings, tire casings, and the like that are known and usable for holding air for pneumatically cushioning a wheel for travelling purposes.

While but two general forms of the invention are shown in the drawings and described in the specification, it is not desired to limit this application for patent to these particular forms, as it is appreciated that other forms could be made that would use the same principles and come within the scope of the appended claim.

Having thus described the invention what is claimed is:

A pneumatic wheel tire having a balancing structure comprising a plurality of partitions extending inwardly and partially from the inner periphery of the tire in a series of planes radial to the tire, said partitions being spaced-apart in planes at right angles to the tire, and a second series of partitions inwardly and partially extending from the inner periphery of the tire, said second series of partitions being spaced-apart in planes at right angles to the first series of planes whereby rectangular cells are formed between the two series of partitions, there being a liquid placed in the tire a height above the lowermost partitions when the tire is at rest and less than the diameter of the tire whereby the liquid is trapped in the cells when the tire revolves and exerts a pressure against the aforesaid partitions to keep the wheel on which the tire is used in a predetermined plane and avoid shimmy.

References Cited in the file of this patent

UNITED STATES PATENTS

| Number | Name | Date |
|---|---|---|
| 497,965 | Owen | May 23, 1893 |
| 1,314,005 | Louden | Aug. 26, 1919 |
| 1,436,594 | McClure | Nov. 21, 1922 |
| 1,459,401 | Hottel | June 19, 1923 |
| 1,938,539 | Lyman | Dec. 5, 1933 |
| 2,463,801 | Page | Mar. 8, 1949 |
| 2,525,781 | Remer | Oct. 17, 1950 |